Nov. 16, 1937.　　　M. WEAVER　　　2,099,505
SEED SEPARATOR
Filed June 16, 1937　　　3 Sheets-Sheet 2

Inventor
Morris Weaver

By Clarence A. O'Brien
Hyman Berman
Attorneys

Inventor
Morris Weaver
By Clarence A. O'Brien
Hyman Berman
Attorneys

Patented Nov. 16, 1937

2,099,505

UNITED STATES PATENT OFFICE 2,099,505

SEED SEPARATOR

Morris Weaver, Fredericksburg, Pa.

Application June 16, 1937, Serial No. 148,583

2 Claims. (Cl. 209—139)

My invention relates to improvements in seed separators and the present application therefor is a continuation in part of my co-pending application for U. S. Letters Patent, Serial No. 87073 filed June 24, 1936.

The invention is designed with the primary purpose in view of providing an efficient inexpensive apparatus which will clean seeds without the use of sieves and by means of air blasts or currents.

Another object of my invention is to provide means for equalizing the airblasts or currents, whereby the air is equally distributed throughout the apparatus.

Other objects are also comprehended by my invention, all of which, together with the exact nature of my improvements will become readily apparent from the following description and claims when read with reference to the drawings accompanying and forming part of this specification.

Figure 1:
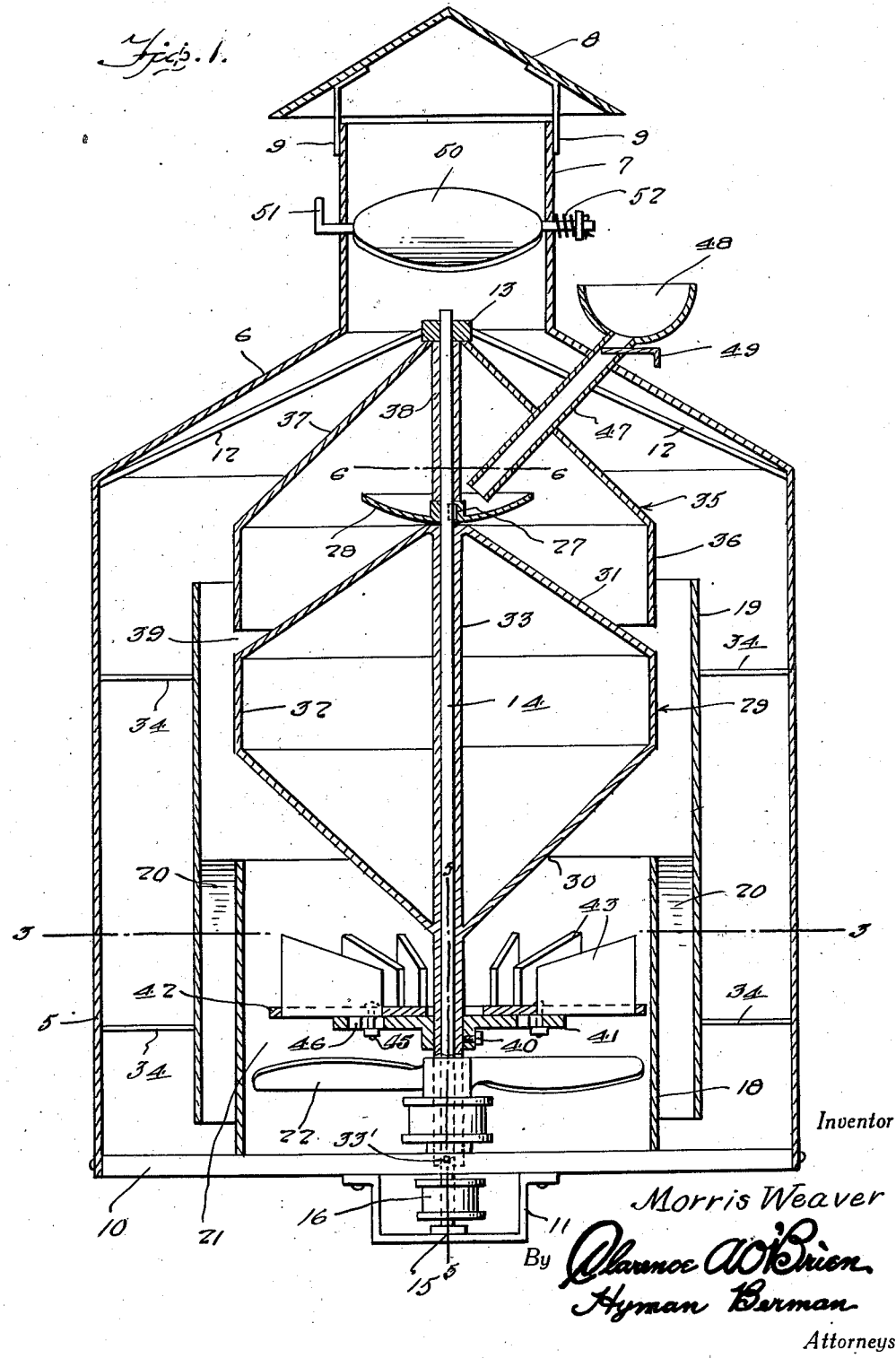
Figure 2:
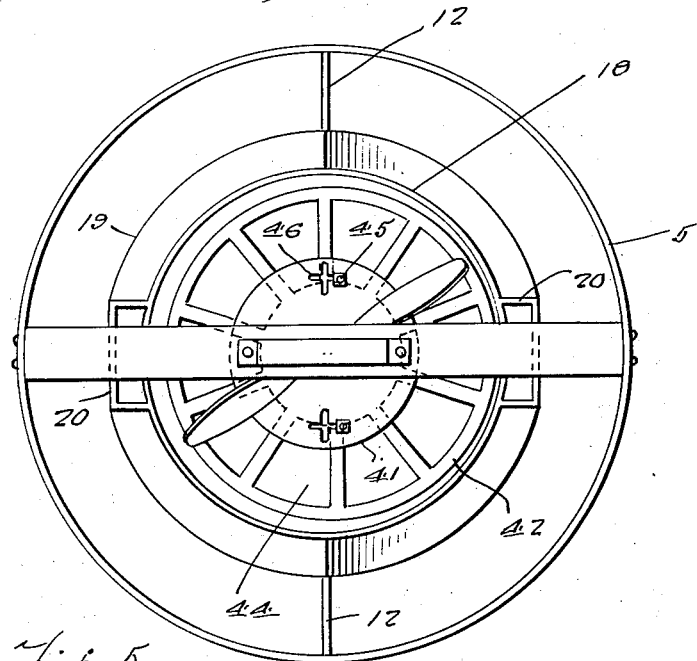
Figure 5:
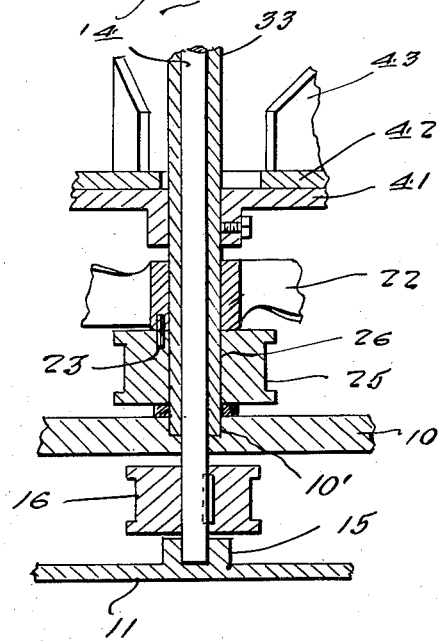
Figure 6:
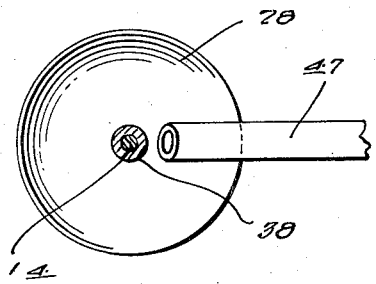
Figure 3:
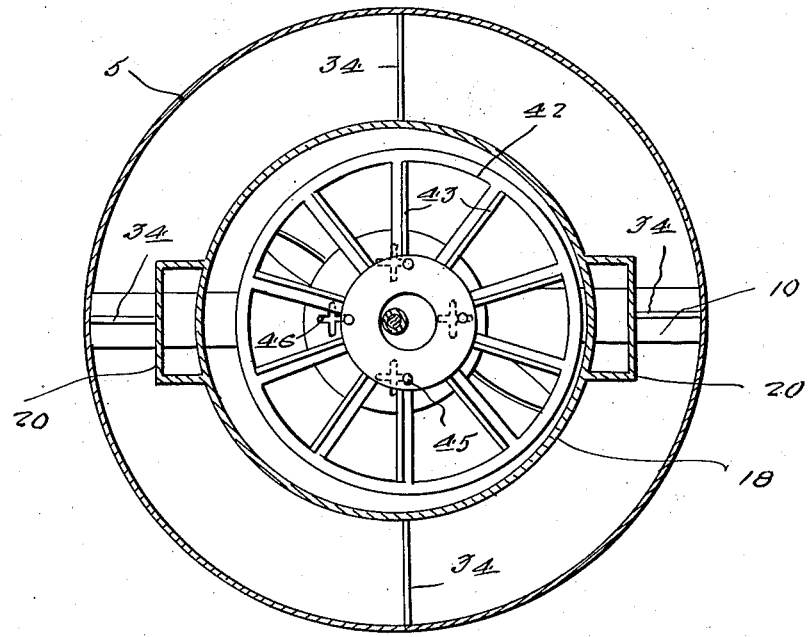
Figure 4:
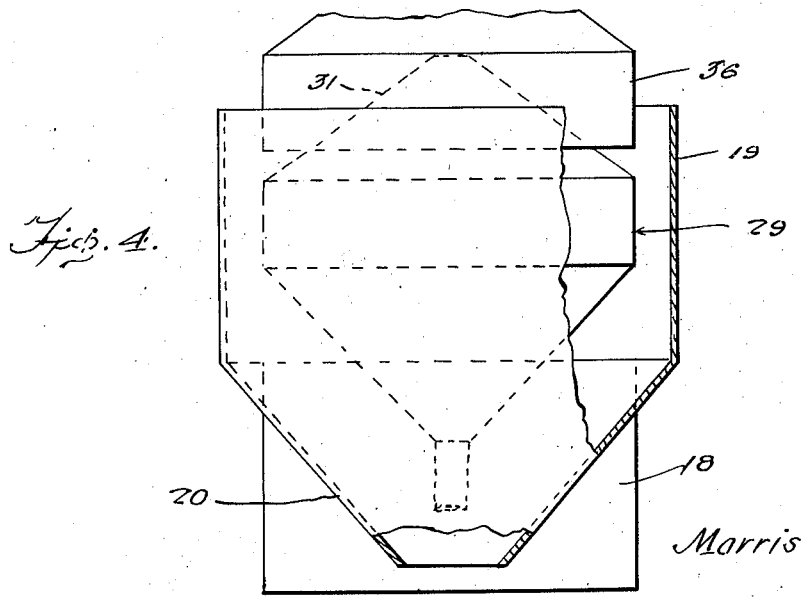

In said drawings:

Figure 1 is a view in vertical transverse section of a seed separator embodying my improvements, Figure 2 is a view in bottom plan drawn to a reduced scale, Figure 3 is a view in transverse section taken on the line 3—3 of Figure 1 looking downwardly, Figure 4 is a fragmentary view partly in side elevation and partly in vertical section of parts of the interior mechanism presently described in detail, Figure 5 is a fragmentary detail view in vertical section taken on the line 5—5 of Figure 1 looking in the direction indicated by the arrows, and Figure 6 is a detail view in transverse section taken on the line 6—6 of Figure 1, looking downwardly.

Describing my invention in detail, with reference to the drawings by numerals, in the illustrated embodiment thereof the separator comprises a cylindrical casing 5, of suitable metal, open at its bottom and provided at its top with a frusto-conical neck 6, a cylindrical outlet flue 7 arising from said neck axially thereof, and a cowl member 8 surmounting said flue 7 and supported thereon by brackets 9. Extending across the bottom of the casing 5 diametrically thereof is a bar like support or beam 10 from which a U-shaped bracket 11 depends in the center thereof all for a purpose presently seen. Within the neck 6 is a plurality of substantially radial arms 12 suitably connected at their outer ends to the casing 5 to incline upwardly toward the center of the casing and supporting in said center a bearing member 13.

In the axis of the casing 5 is a vertically disposed shaft 14 having its upper end journalled in the bearing 13 and its lower end extending through the before mentioned support 10 and journalled in a bearing boss 15 on the before mentioned bracket 11. Fast on the lower end of said shaft 14 intermediate the support 10 and the boss 15 is a drive pulley 16 for a belt connection to a source of power, not shown.

Within the cylinder 5, concentrically thereof, is a cylindrical structure of relatively smaller diameter, also shorter than the cylinder 5, and comprising a lower inner section 18, resting on the cross bar 10, an upper enlarged outer section 19 concentric thereto, and a pair of opposed tapered seed discharge chutes 20 upon opposite sides of said structure, respectively, depending from the upper section along side the lower section to points adjacent the bottom of the latter. Stay rods 34 extending between the section 18 and casing 5 center said section in the casing. As best shown in Figure 4, said chutes 20 are formed conjointly by the upper and lower sections 19 and 18. The lower section 18 is designed to form an air tunnel 21 open at its upper and lower ends. In the lower end of the lower section 18 is a blower fan 22 pitched to direct air upwardly through said tunnel 21 and rotatably mounted concentrically thereof in a manner presently explained.

Keyed to the shaft 14, as at 27, for rotation thereby above the upper section 19 is a concave plate-like seed distributor 28 designed under centrifugal action to throw seed upwardly and outwardly therefrom.

Intermediate the lower section 18 and the seed distributor 28 is a cylindrical deflector 29 having a lower air deflecting end 30 of inverted cone-shape extending into the lower section 18, an upper cone-shaped seed deflector end 31 extending above the upper section 19 to said distributor, and an intermediate cylindrical portion 32 of the same diameter as the lower section 18. The deflector 29 is centered relative to the sections 18 and 19 by means of an integral sleeve 33 through which the shaft 14 extends, said sleeve depending from the upper end 31 through and below the lower end 30 and into a socket 10' in the support 10 to provide a long bearing for the shaft 14 and to support the deflector 29. A set screw 33' threaded into the support 10 against the socketed end of the sleeve 33 holds the latter and the deflector 29 stationary. The blower fan 22 is rotatably mounted on the lower end of the sleeve 33. A belt pulley 25 is rotatably mounted on the sleeve 33 by means of a bore 26 therein and operatively connected to said fan by means of a key 23. Above the deflector 29, and extending at its lower end in the upper section 19, is a conical canopy like seed deflector or baffle 35 having a lower cylindrical end 36 depending into the upper section 19, a top part 37 tapering to the bearing 13, and an axial sleeve 38 depending from the top part 37 to the distributor 28 to enclose the shaft 14 between these two points. The top part 37 of the deflector 35 extends below the distributor 28 and the lower end 36 is of the same diameter as the portion 32 of the deflector 29 and spaced slightly above the same to provide an outlet 39 therebetween.

In order to prevent whirling of the air currents from the blower fan 22, and in the tunnel 21, the following devices are provided.

Fixed to the lower end of the sleeve 33, as by a set screw 40, is a circular supporting plate 41 on which a larger circular air distributor 42, of slightly smaller diameter than the lower section 18, is mounted, said distributor including upstanding radial deflector blades 43 and openings 44 between said blades. The distributor 42 is slidably adjustable on the plate 41, transversely of the section 18, into different set positions established by bolts 45 depending therefrom into cross shaped slots 46 in the plate 41. The distributor 42 functions to equalize the distribution of air entering the tunnel 21 particularly by offsetting the obstruction of the support 10, pulleys 16 and 25, and related belts. Seed is fed to the distributor 28 by way of a spout 47 inclining downwardly through the conical top 6 of the casing 5 and through the end 37 of the deflector 35 into said distributor and provided at its upper end with a seed hopper 48 and a gate valve 49 below said hopper.

A damper 50 is suitably mounted in the flue 7 for setting by a handle 51 and provided with the usual spring 52 for frictionally tensioning the same to establish the different set positions thereof.

Referring to the operation, upon rotation of the shaft 14 air is blown through the tunnel 21 by the blower fan 22 against the bottom end 30 of the deflector 29 which deflects the air currents outwardly and upwardly into the upper section 19 of the described cylindrical structure from which the air blasts against the conical neck 6 of the cylinder 5 and is thereby deflected into the flue 7 and out of the latter. The seed in the distributor 28 is thrown upwardly and outwardly against the conical top end 37 of the deflector 35 to fall upon the top end 31 of the deflector 29 and gravitate through the outlet 39 into the upper end of the section 19. At this point, the air currents blow the foreign matter and light worthless seed out of the section 19 to fall through the space between the cylinder 5 and described cylindrical structure to the ground. The seeds, because of their weight, gravitate against the air currents to fall into the chutes 20 from which they are discharged at the bottom thereof into bags or sacks, not shown. The air distributor 42 may be centered in the section 18 or adjusted eccentrically thereof to equalize the air currents as occasion may require. As will be understood, by setting the damper 15, the air current produced by the blower fan 22 may be variably controlled.

The invention will, it is believed, be understood from the foregoing description thereof, without further explanation.

While in the foregoing certain preferred relations of parts and details of construction have been described, obviously such relations and parts may be variously modified without departing from the inventive concept, and right is herein reserved to all such modifications falling within the scope of the claims appended hereto.

What I claim is:

1. A pneumatic seed separator comprising a cylindrical upstanding casing open at its lower end and having a conical upper neck terminating in an open flue member, a bar extending diametrically across the lower end of said casing, an upstanding cylindrical structure in said casing supported on said bar axially of said casing and terminating short of the neck thereof, said structure comprising a lower open-ended section forming a vertical air tunnel, and a relatively larger concentric upper section forming a separator chamber above the air tunnel open at its upper end, said structure also including a pair of tapered seed discharge chutes extending from the bottom of the upper section upon opposite sides of the lower section, respectively, a cylindrical deflector mounted in said upper section of the same diameter as said lower section and supported above the latter concentrically thereof, said member having oppositely coned ends, the lower end extending partially into said lower section to deflect air therefrom obliquely and upwardly against the inner wall of the upper section, and the upper end of said member forming a spreader for deflecting seed deposited thereon against the side wall of the upper section outwardly and downwardly, a concave circular seed distributor rotatably mounted adjacent to the upper end of said deflector member for ejecting seed deposited therein upwardly and outwardly under the action of centrifugal force, a cylindrical baffle member mounted in said casing concentrically thereof above said deflector member and having a lower skirt depending into said upper section adjacent the said upper end of the deflector to form a narrow discharge opening around the edge of said end for the passage of seed from said end into the upper section, said baffle member having an upper conical end for deflecting seed ejected from said distributor downwardly and outwardly, a gravity feed device for depositing seed in said distributor, means for rotating the distributor comprising a rotatably mounted shaft extending upwardly through said cylindrical structure and deflector member axially thereof, and a blower fan rotatably mounted in the lower end of said air tunnel.

2. A pneumatic seed separator comprising a cylindrical upstanding casing open at its lower end and having a conical upper neck terminating in an open flue member, a bar extending diametrically across the lower end of said casing, an upstanding cylindrical structure in said casing supported on said bar axially of said casing and terminating short of the neck thereof, said structure comprising a lower open-ended section forming a vertical air tunnel, and a relatively larger concentric upper section forming a separator chamber above the air tunnel open at its upper end, said structure also including a pair of tapered seed discharge chutes extending from the bottom of the upper section upon opposite sides of the lower section, respectively, a cylindrical deflector mounted in said upper section of the same diameter as said lower section and supported above the latter concentrically thereof, said member having oppositely coned ends, the lower end extending partially into said lower section to deflect air therefrom obliquely and upwardly against the inner wall of the upper section, and the upper end of said member forming a spreader for deflecting seed deposited thereon against the side wall of the upper section outwardly and downwardly, a concave circular seed distributor rotatably mounted adjacent to the upper end of said deflector member for ejecting seed deposited therein upwardly and outwardly under the action of centrifugal force, a cylindrical baffle member mounted in said casing concentrically thereof above said deflector member and having a lower skirt depending into said upper section adjacent the said upper end of the deflector to form a narrow discharge opening around the edge of said end for the passage of seed from said end into the upper section, said baffle member having an upper conical end for deflecting seed ejected from said distributor downwardly and outwardly, a gravity feed device for depositing seed in said distributor, means for rotating the distributor comprising a rotatably mounted shaft extending upwardly through said cylindrical structure and deflector member axially thereof, a blower fan rotatably mounted in the lower end of the air tunnel, and an air flow straightening means in said lower section intermediate said fan and deflector member comprising a circular plate fixedly mounted concentrically of said shaft, and a circular relatively larger spider having radial blades thereon and mounted on said plate for edgewise adjustments into different set positions.

MORRIS WEAVER.